United States Patent
Kao et al.

(10) Patent No.: US 11,226,983 B2
(45) Date of Patent: Jan. 18, 2022

(54) SUB-SCOPE SYNCHRONIZATION

(71) Applicant: Microsoft Technology Licensing, LLC, Redmond, WA (US)

(72) Inventors: Chih-Pin Kao, Redmond, WA (US); Xi Tong, Sammamish, WA (US); Keping Zhao, Sammamish, WA (US); Lin Wang, Bothell, WA (US); Gregory Powell Young, Kirkland, WA (US); Deepak Sreenivas Pemmaraju, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 234 days.

(21) Appl. No.: 16/444,864

(22) Filed: Jun. 18, 2019

(65) Prior Publication Data

US 2020/0401600 A1 Dec. 24, 2020

(51) Int. Cl.
*G06F 16/27* (2019.01)
*G06F 21/62* (2013.01)
*H04L 29/06* (2006.01)

(52) U.S. Cl.
CPC .............. *G06F 16/27* (2019.01); *G06F 21/62* (2013.01); *H04L 63/04* (2013.01); *H04L 63/08* (2013.01);
(Continued)

(58) Field of Classification Search
CPC ........ G06F 16/27; G06F 21/62; G06F 16/178; G06F 16/176; G06F 21/60; H04L 63/04;
(Continued)

(56) References Cited

U.S. PATENT DOCUMENTS 6,006,274 A * 12/1999 Hawkins ............... G06F 1/1626
709/248
6,510,210 B1 * 1/2003 Baughan ................ H04L 63/04
379/102.03
(Continued)

OTHER PUBLICATIONS

Chard, et al., "Efficient and Secure Transfer, Synchronization, and Sharing of Big Data", In Journal of IEEE Cloud Computing, vol. 1, Issue 3, Sep. 2014, pp. 46-55.
(Continued)

*Primary Examiner* — Aravind K Moorthy
(74) *Attorney, Agent, or Firm* — Michael Best & Friedrich LLP

(57) ABSTRACT

Systems and methods for synchronizing data between an online data source and a client application. The method includes, in response to a change in a permission associated with a user to a protected data set included in a shared data space of the online data source, receiving, with the client application associated with the user, a protected data synchronization token issued by the online data source associated with the protected data set and downloading, with the client application, the protected data set included in the shared data space from the online data source to the client application using the protected data synchronization token without re-downloading a public data set included in the shared data space. After downloading the protected data set, the method includes synchronizing the shared data space, including the protected data set and the public data set, using a stored data space synchronization token.

20 Claims, 4 Drawing Sheets

(52) U.S. Cl.
CPC .......... *H04L 63/102* (2013.01); *H04L 63/105* (2013.01); *H04L 2463/082* (2013.01)

(58) Field of Classification Search
CPC ..... H04L 63/08; H04L 63/102; H04L 63/105; H04L 2463/082; H04L 63/10
See application file for complete search history.

(56) References Cited

U.S. PATENT DOCUMENTS

| | | | |
|---|---|---|---|
| 7,478,434 B1 | 1/2009 | Hinton et al. | |
| 8,656,472 B2 | 2/2014 | McMurtry et al. | |
| 8,793,509 B1* | 7/2014 | Nelson ................ | H04L 63/105 713/193 |
| 9,043,605 B1 | 5/2015 | Machani | |
| 9,280,773 B1* | 3/2016 | Evans ................ | G06Q 20/1235 |
| 9,635,132 B1* | 4/2017 | Lin ................ | G06F 3/0652 |
| 9,819,665 B1* | 11/2017 | Machani ............. | H04L 63/083 |
| 9,853,979 B1* | 12/2017 | Roth ................ | H04L 63/20 |
| 10,037,339 B1* | 7/2018 | Kleinpeter ............ | G06F 16/148 |
| 10,402,373 B1* | 9/2019 | VanderKnyff ........ | G06F 16/957 |
| 10,469,484 B1* | 11/2019 | Chen ................ | H04L 63/062 |
| 10,606,576 B1* | 3/2020 | Tung ................ | H04L 63/104 |
| 10,616,336 B1* | 4/2020 | Zelenov ............ | H04L 67/06 |
| 2003/0217152 A1* | 11/2003 | Kasper, II .......... | G06F 16/2343 709/226 |
| 2004/0236795 A1* | 11/2004 | Johnston ............ | H04L 67/04 |
| 2005/0131905 A1* | 6/2005 | Margolus ............ | G06F 21/6209 |
| 2007/0044096 A1* | 2/2007 | Choe ................ | H04H 20/20 717/178 |
| 2007/0130283 A1* | 6/2007 | Klein ................ | H04L 67/327 709/217 |
| 2007/0130463 A1* | 6/2007 | Law ................ | G06F 21/41 713/168 |
| 2008/0114771 A1* | 5/2008 | Welingkar ............ | G06F 16/27 |
| 2008/0168544 A1* | 7/2008 | von Krogh ............ | H04L 63/102 726/6 |
| 2009/0276462 A1* | 11/2009 | Inokuchi ............ | G11B 20/00427 |
| 2012/0158815 A1* | 6/2012 | Kelly ................ | G06F 16/9574 709/201 |
| 2012/0174212 A1* | 7/2012 | Dart ................ | H04L 67/306 726/19 |
| 2012/0331529 A1* | 12/2012 | Ibel ................ | G06F 21/6218 726/4 |
| 2013/0013560 A1 | 1/2013 | Goldberg et al. | |
| 2013/0117064 A1* | 5/2013 | Sadeghi ............ | G06Q 10/0633 705/7.27 |
| 2013/0227677 A1* | 8/2013 | Pal ................ | H04L 9/3228 726/19 |
| 2013/0268999 A1* | 10/2013 | Kiang ................ | G06Q 10/101 726/4 |
| 2014/0033278 A1* | 1/2014 | Nimashakavi ......... | G06F 21/40 726/4 |
| 2014/0053182 A1 | 2/2014 | Jaager et al. | |
| 2014/0053227 A1* | 2/2014 | Ruppin ................ | H04L 67/06 726/1 |
| 2014/0143836 A1* | 5/2014 | Fletcher ............ | G06F 21/10 726/4 |
| 2014/0165176 A1 | 6/2014 | Ow et al. | |
| 2014/0380426 A1* | 12/2014 | Lin ................ | G06F 21/31 726/4 |
| 2015/0100357 A1 | 4/2015 | Seese et al. | |
| 2015/0180894 A1* | 6/2015 | Sadovsky ............ | H04L 67/22 726/22 |
| 2015/0235042 A1* | 8/2015 | Salehpour ............ | G06F 21/44 726/4 |
| 2015/0347552 A1* | 12/2015 | Habouzit ............ | G06F 16/273 707/613 |
| 2015/0349958 A1* | 12/2015 | Lindell ............ | H04L 9/3228 713/168 |
| 2016/0014107 A1* | 1/2016 | Hamauzu ............ | H04L 63/10 726/5 |
| 2016/0188317 A1* | 6/2016 | Hilliar ............ | H04W 4/60 717/172 |
| 2016/0337369 A1* | 11/2016 | Sanso ................ | H04L 63/102 |
| 2016/0381023 A1* | 12/2016 | Dulce ................ | H04L 63/1491 726/9 |
| 2017/0244608 A1* | 8/2017 | Reaux-Savonte ...... | G06N 5/022 |
| 2017/0262659 A1* | 9/2017 | Kuris ................ | H04L 63/0428 |
| 2017/0270136 A1* | 9/2017 | Chen ................ | G06F 16/13 |
| 2017/0325089 A1* | 11/2017 | Sharma ............ | H04L 63/0428 |
| 2018/0004972 A1* | 1/2018 | Ruggiero ............ | H04L 63/107 |
| 2018/0075081 A1* | 3/2018 | Chipman ............ | G06Q 20/367 |
| 2018/0084044 A1* | 3/2018 | Nichols ............ | G06F 16/16 |
| 2018/0101544 A1* | 4/2018 | Watson ............ | G06F 16/178 |
| 2018/0103311 A1* | 4/2018 | Chen ................ | G06F 21/606 |
| 2018/0189372 A1* | 7/2018 | Joiner ................ | G06Q 10/10 |
| 2018/0191805 A1* | 7/2018 | Hurwitz ............ | H04L 67/26 |
| 2018/0213059 A1* | 7/2018 | Alsina ............ | H04L 63/102 |
| 2018/0295126 A1* | 10/2018 | Gilpin ............ | H04L 9/3213 |
| 2018/0336334 A1* | 11/2018 | Yadav ................ | G06F 21/52 |
| 2019/0079949 A1* | 3/2019 | Nichols ............ | G06F 16/148 |
| 2019/0079986 A1* | 3/2019 | Nichols ............ | G06Q 10/103 |
| 2019/0116494 A1* | 4/2019 | Salloum ............ | H04L 63/0838 |
| 2019/0207929 A1* | 7/2019 | Koorapati ............ | G06F 16/119 |
| 2019/0213272 A1* | 7/2019 | Wong ................ | G06F 16/2379 |
| 2019/0306247 A1* | 10/2019 | Park ................ | H04L 67/12 |
| 2019/0320039 A1* | 10/2019 | Kamal ............ | H04L 67/306 |
| 2019/0342290 A1* | 11/2019 | Mittal ............ | H04L 63/083 |
| 2019/0394163 A1* | 12/2019 | Otsubo ............ | H04L 61/1582 |
| 2020/0145425 A1* | 5/2020 | Chauhan ............ | H04L 63/107 |
| 2020/0380509 A1* | 12/2020 | Billman ............ | G06Q 20/385 |
| 2021/0034571 A1* | 2/2021 | Bedadala ............ | G06F 11/1456 |
| 2021/0034574 A1* | 2/2021 | Choudhari ............ | G06F 16/162 |
| 2021/0097135 A1* | 4/2021 | Tian ................ | G06F 40/186 |

OTHER PUBLICATIONS

"International Search Report and the Written Opinion Issued in PCT Application No. PCT/US20/030323", dated Aug. 5, 2020, 13 Pages.
"Authorizing Requests to the Google Calendar API", Retrieved from: https://developers.google.com/calendar/auth, Nov. 20, 2018, 4 Pages.
"Google Calendar API", Retrieved from: https://developers.google.com/calendar/v3/sync, Retrieved Date: Apr. 12, 2019, 6 Pages.
Maguire, et al., "Using hybrid Modern Authentication with Outlook for iOS and Android", Retrieved from: https://docs.microsoft.com/en-US/exchange/clients/outlook-for-ios-and-android/use-hybrid-modern-auth?view=exchserver-2019, Apr. 10, 2019, 27 Pages.

* cited by examiner

SUB-SCOPE SYNCHRONIZATION

FIELD

Embodiments described herein generally relate to synchronizing data between an online data source and a client device and, in particular, synchronizing protected data associated with changed user permissions while limiting data download requirements and associated computing resources.

SUMMARY

Many computing devices, such as personal computers, smartphones, and laptops, have access to remote online data sources, including, for example, data stored in a file management system, such as Microsoft OneDrive®. These online data sources store data (files) accessible for download and modification by the various computing devices that have access to the online data sources. These computing devices may also have local client software applications installed that allow the computing devices to access the online data source and, in some instances, download and cache a local copy of data accessible via the online data source.

For example, an online data source may store a shared data space accessible by one or more users, wherein the shared data space includes public and protected data (or lightly protected data and strongly protected data). A user must have permission to access the protected data and must provide authenticating information, such as performing multi-factor authentication, to access the protected data. In particular, when a user is granted permission to protected data within the shared data space (and the user's providing verified authenticating information), online data source provides a token to that allows the local client software application installed on the user's computing device to download the data stored within the shared data space that is accessible to the user based on the user's current permissions (including public information and protected information the user has permission to access). Thus, as a user's permissions change (for example, to allow the user to access additional protected data), the user's computing device uses the received token to download all the applicable data including both protected data and public data. Accordingly, the use of authentication tokens adds to the computational resource burden on the computing device, the communication network, the online data source, or a combination thereof. This is especially true when the downloaded information includes a larger amount of public data than protected data, as this public data is also re-downloaded as permissions change.

Thus, embodiments described herein provide, among other things, systems and methods for synchronizing data between an online data source and a client device to more efficiently use computing resources of the client device, the communication network, and the online data source and prevent delay in a user accessing needed data. In particular, embodiments described herein perform sub-scope synchronization wherein, in response to a permission change and valid authentication, a user receives an authentication token that allows the user to download new protected data accessible to the user within the shared data space without re-downloading (or otherwise synchronizing) other portions or the shared data space, such as public data. After this download is complete, the user uses a stored synchronization token to synchronize downloaded data from the shared data space, including the new protected data set and any public data.

For example, one embodiment provides a method for synchronizing data between an online data source and a client software application. The method includes, in response to a change in a permission associated with a user to a protected data set included in a shared data space of the online data source, receiving, with the client application associated with the user, a protected data synchronization token issued by the online data source associated with the protected data set and downloading, with the client application, the protected data set included in the shared data space from the online data source to the client application using the protected data synchronization token without re-downloading a public data set included in the shared data space. After downloading the protected data set, the method includes synchronizing the shared data space, including the protected data set and the public data set, between the online data source and the client application using a stored data space synchronization token.

Another embodiment provides a system for synchronizing data between an online data source and a client software application. The system includes a user device including a memory storing the client application and an electronic processor configured to execute the client application to, in response to a change in a permission associated with a user to a protected data set included in a shared data space of the online data source, receive a protected data synchronization token from the online data source and download the protected data set included in the shared data space from the online data source to the client application using the protected data synchronization token without re-downloading a public data set included in the shared data space. After downloading the protected data set, the system is configured to synchronize the shared data space, including the protected data set and the public data set, between the online data source and the client application using a stored data space synchronization token and the protected data synchronization token.

A further embodiment provides a non-transitory computer-readable medium storing instructions that, when executed by an electronic processor, perform a set of functions. The set of functions includes, in response to a change in a permission associated with a user to data included in a shared data space of an online data source, the change in the permission including the withdrawal of a permission to a protected data set included in the stored data space, receiving a revocation notice from the online data source for a previously received protected data synchronization token associated with the protected data set; and in response to the revocation notice, deleting the protected data synchronization token, deleting the protected data set from a locally-stored copy of the shared data space without deleting a public data set from the locally-stored copy of the shared data space, and, after deleting the protected data set, synchronizing the shared data space, including the public data set and excluding the protected data, between the online source and the client application using a stored data space synchronization token.

DETAILED DESCRIPTION

Figure 1:
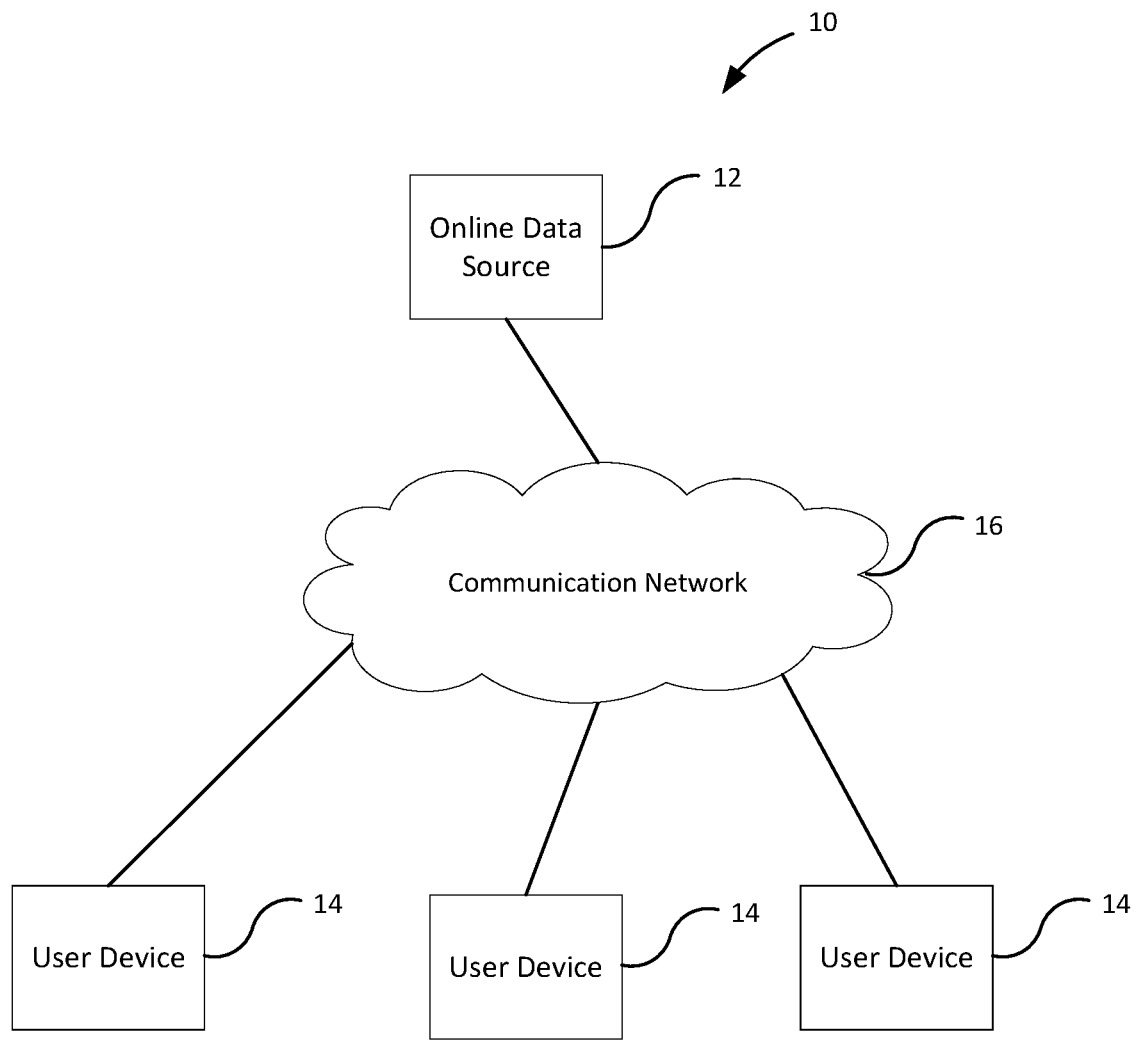
FIG. 1 schematically illustrates a system for synchronizing data between an online data source and a client software application according to one embodiment.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As described above, users often need to synchronize a large amount of public data when synching protected data, including when a user is granted access to new protected data not previously downloaded to the user's device. This process wastes computing resources and user time. Accordingly, embodiments described herein perform a sub-scope synchronization, wherein new protected data is downloaded using an authentication token specific to the new protected data and this authentication token, in combination with an existing synchronization token, is subsequently used to maintain synchronization between the online data source and the user's device, including both the new protected data and any public data. In other words, only the newly-added protected data is download without re-downloading (or otherwise synchronizing) an entire data space including the new protected data, including, for example, the public data.

FIG. 1 schematically illustrates a system 10 for synchronizing data between an online data source and a client software application. As illustrated in FIG. 1, the system 10 includes an online data source 12, a plurality of client or user devices 14 (also referred to individually as a user device 14), and a communication network 16. It should be understood that the system 10 is provided as an example and, in some embodiments, the system 10 includes additional components. For example, the system 10 may include fewer or additional user devices 14, more than one online data source 12, more than one communication network 16, and the like.

The online data source 12 and the plurality of user devices 14 communicate over the communication network 16. Portions of the communication network 16 may be implemented using a wireless network, such as a wide area network (for example, the Internet), a local area network (for example, a Bluetooth™ network or Wi-Fi), or combinations or derivatives thereof. Alternatively or in addition, portions of the communication network 16 may be implemented using dedicated connections (such as wired or wireless connections). It should also be understood that, in some embodiments, the online data source 12 and the plurality of user devices 14 may communicate through one or more intermediary devices not shown in FIG. 1.

Figure 2:
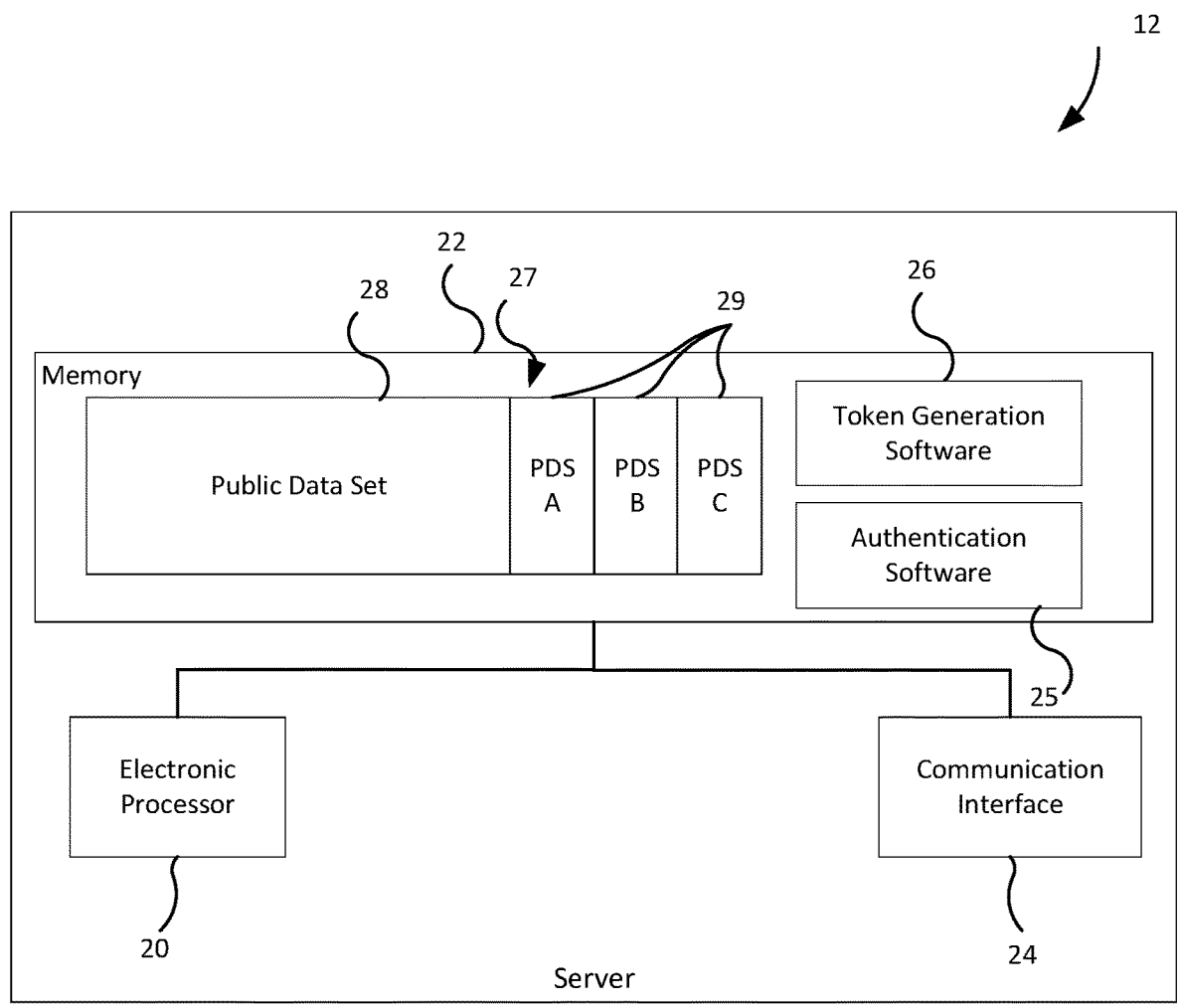
FIG. 2 schematically illustrates an online data source included in the system of FIG. 1 according to one embodiment.

The online data source 12 includes one or more computing devices, such as one or more servers. For example, as illustrated in FIG. 2, in some embodiments, the online data source 12 includes at least one server including an electronic processor 20, a memory 22, and a communication interface 24. The electronic processor 20, the memory 22, and the communication interface 24 communicate over one or more communication lines or buses, wirelessly, or a combination thereof. In some embodiments, the online data source 12 includes additional components than those illustrated in FIG. 2 and the components included in the online data source 12 may arranged in various configurations. For example, as previously noted, in some embodiments, the online data source 12 includes a plurality of servers, databases, and the like to provide an online data source.

The communication interface 24, which may include a wireless transceiver, allows the online data source 12 to communicate with external devices, such as the plurality of user devices 14 over the communication network 16.

The memory 22 includes a non-transitory, computer-readable storage medium. The electronic processor 20 includes a microprocessor, application-specific integrated circuit (ASIC), or another suitable electronic device. The electronic processor 20 is configured to retrieve data from the memory 22 and execute, among other things, software (instructions) related to the methods described herein.

For example, as illustrated in FIG. 2, the memory 22 stores authentication software 25 and token generation software 26. It should be understood that the functionality described herein as being performed by the software 25 and 26 can be combined and distributed in various configurations. For example, in some embodiments, the functionality described herein as being performed via the token generation software 26 is performed by the authentication software 25 or vice versa. Also, in some embodiments, software applications used by the online data source 12 may be stored in different memories on the same or different servers or other types of computing devices. Accordingly, the configuration of the software illustrated in FIG. 2 is provided as one example configuration and should not be considered limiting.

The authentication software 25, when executed by the electronic processor 20, authenticates a user or user device 14 associated with the user based on authenticating information for purposes of granting access to the online data source 12 and, in particular, granting access to protected data stored within the online data source 12. In some embodiments, the authentication software 25 is configured to perform multi-factor authentication to authenticate users (such as sending an electronic communication with a verification code to a user via an e-mail, text message, or the like). However, other authentication techniques can be used.

The token generation software 26, when executed by the electronic processor 20, generates protected data synchronization ("protected data sync") tokens that authorize users of the user devices 14 to access protected data as described below. In some embodiments, the token generation software 26 generates such tokens after a user is authenticated via the authentication software 25. The protected data sync tokens generated by the token generation software 26 are, for example, immutable (for example, text) strings that contain a unique identifier parsable to identify a user, a user device 14, a client application installed on the user device 14, or a combination thereof and grant access to data otherwise protected from public access. For example, a protected data sync token may identify protected data stored within the online data source 12 a user is authorized to access and download. An authentication token may also include timing information, such as a timestamp indicating a last download or synchronization of a particular protected data set.

In some embodiments, the token generation software 26 also generates data space synchronization ("data space sync") tokens. Data space tokens are used to synchronize previously-downloaded data to capture changes made to data maintained with the online data source 12. A data space sync token may identify a user, a user device 14, a client application installed on the user device 14, or a combination thereof. In some embodiments, a data space sync token also includes information identifying data to synchronize, including protected data sets a user is authorized to access. In some embodiments, a data space sync token also includes timing information (a timestamp) such as a time the most recent synchronization was performed, or the like.

For example, data space sync tokens may be used to track changes within a shared data space maintained by the online data source 12. For example, when a user first accesses the online data source 12, the online data source 12 may provide an initial data space sync token, which may be an empty string. When a user subsequently requests synchronization (which may be performed periodically or in response to a user request or other triggering action or event), the user submits the data space sync token to the online data source 12 (for example, as part of a synchronization request). The online data source 12 uses the received data space sync token to determine an applicable timestamp representing the time of a last download or synchronization, which the online data source 12 uses to identify (by querying one or more database) data items included in the shared data space that have a modification date bigger than (past) the applicable timestamp. The online data source 12 sorts the identified data items (by modification date) and returns the identified data items (as sorted) to the user along with an updated data space sync token including an updated timestamp. The timestamp may be set to a current time and date or a time immediately following the last identified modification. The user (user device 14) applies the received modification to a locally-stored copy of the shared space to maintain the local copy consistent with the online data source 12. Accordingly, in some embodiments, a user receives one data space sync token that applies to a shared data space but will receive a separate protected data sync token for each protected data set included in the shared data space. In some embodiments, each protected data sync token functions similar to the data space sync token as described above but is used to only identify modifications within the protected data set (as compared to entire shared data space).

As illustrated in FIG. 2, the online data source 12 also includes a shared data space 27, which includes a public data set 28 and one or more protected data sets 29A, 29B, and 29C (also referred to generically as a protected data set 29). As discussed above, one or more users are associated with the shared data space 27 and these users can access the shared data space 27 to download data stored in the space 27 for local storage on a user device 14. To maintain the locally-stored data consistent with the data stored in the shared data space 27, the user device 14 periodically (on an automated frequency, in response to a user request or other triggering event, or a combination thereof) synchronizes the locally-stored data with the data contained in the shared data space 27, such as by using a data space sync token as described above. As also described above, each user associated with the shared data space 27 can access and download public data sets 28 stored in the space 27. However, with respect to the protected data sets 29, a user must be granted permission to access the protected data set 29 and must provide authenticating information to access protected data according to the user's current permissions. In some embodiments, the public data set 28 and protected data set 29 are both protected and need authorization to access. In these embodiments, the protected data set 29 is more protected than the public data set 28. For example, the public data set 28 may require signing into an account or performing authorization to access, while the protected data set 29 may require both of these, and additionally requires multi-factor authorization every time the user wishes to access the protected data set 29.

In some embodiments, the public data set 28 and the protected data set 29 may include multiple layers of data requiring different levels of authorization. For example, the protected data set 29 may include a second level of data protected by a further authorization (for example, a more protected data set available only to managers or those of certain clearance who has access to the protected data set 29). Much like the protected data set 29 requiring further permission to access than the public data set 28, this second layer requires further permission to access than the protected data set 29, even if the user has access to the protected data set 29. Also, in a single layer, there could be multiple scopes (for example, folders) that each require a different authentication (for example, different passwords, codes, or the like).

In some embodiments, at least a portion of the data stored in the shared data set 27 (for example, at least one of the protected data sets 29A-C) may be encrypted. This is especially advantageous if a user is granted permission to a protected data set and the user device 14 has malware or other harmful software that may corrupt the protected data set 29.

It should be understood that the shared data space 27 hosted by the online data source 12 may be distributed over multiple memories included in a single server or multiple servers or other computing devices, such as one or more databases.

Figure 3:
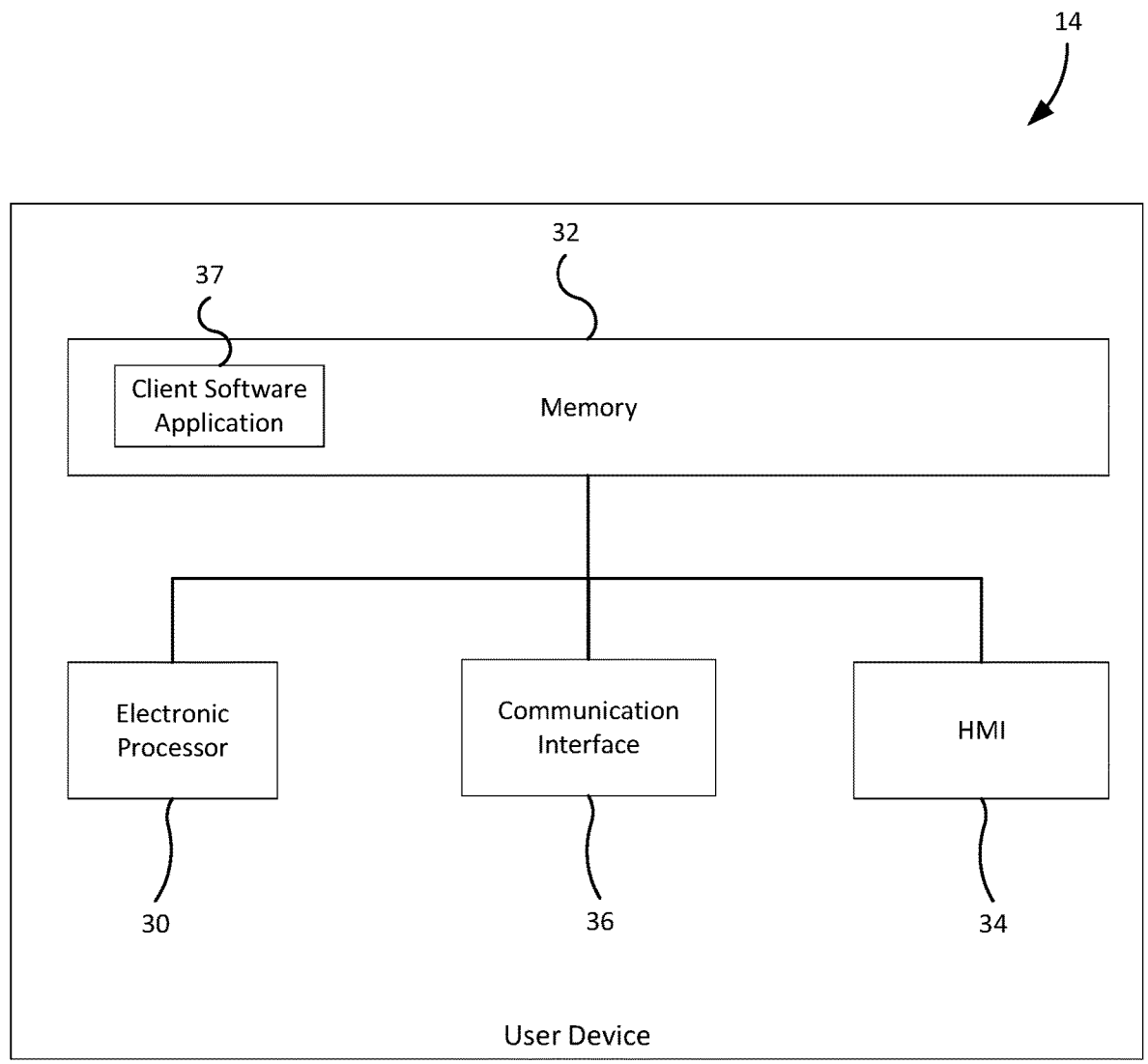
FIG. 3 schematically illustrates a user device included in the system of FIG. 1 according to one embodiment.

Each of the plurality of user devices 14 is remote (separate) from the online data source 12 and includes a computing device, such as a desktop computer, a laptop computer, a tablet computer, a terminal, a server, a smart television, an electronic whiteboard, a tablet computer, a smart telephone, a wearable device, or the like. As illustrated in FIG. 3, in some embodiments, the user device 14 includes an electronic processor 30, a memory 32, a human-machine interface (HMI) 34, and a communication interface 36. The electronic processor 30, the memory 32, the HMI 34, and the communication interface 36 communicate over one or more communication lines or buses, wirelessly, or a combination thereof. In some embodiments, the user device 14 includes additional components than those illustrated in FIG. 3, such as additional memories, processors, or the like. In addition, the components included in the user device 14 illustrated in FIG. 3 may arranged in various configurations.

The communication interface 36, which may include a wireless transceiver, allows the user device 14 to communicate with external devices, such as the online data source 12 over the communication network 16.

The HMI 34 includes an input device, an output device, or a combination thereof. For example, the HMI 34 may include a display device, a touchscreen, a keyboard, a keypad, a button, a cursor-control device, a printer, a speaker, a virtual reality headset, a microphone, and the like. In some embodiments, the user device 14 includes multiple HMIs. For example, the user device 14 may include a touchscreen and a keypad. In some embodiments, a HMI 34 is included in the same housing as the user device 14. However, in other embodiments, a HMI 34 may be external to the user device 14 but may communicate with the user device 14 over a wired or wireless connection. For example, in some embodiments, the user device 14 includes a display device connected to the user device 14 via a cable or other type of wired or wireless connection.

The memory 32 includes a non-transitory, computer-readable storage medium. The electronic processor 30 includes a microprocessor, application-specific integrated circuit (ASIC), or another suitable electronic device. The electronic processor 30 is configured to retrieve data from the memory 32 and execute, among other things, software instructions to perform various functionality.

As illustrated in FIG. 3, the memory 32 stores a client software application 37. The client software application 37, when executed by the electronic processor 30, manages access to, download of, and synchronization of data stored in the online data source 12 (for example, the shared data space 27). For example, the client software application 37 may provide user interfaces that allow a user to view and access data stored in the shared data space 27, select data for download for local storage on the user device 14 (the memory 32), make changes to the downloaded data, and synchronize any changes made to the data at the user device 14 and the online data source 12. It should be understood that the client software application 37 may also perform additional functionality not described herein. For example, in some embodiments, the client software application 37 also performing data processing functionality, such as functionality provided via a spreadsheet application, a word processing application, a presentation application, a database application, or the like.

In some embodiments, protected data sync tokens and data space sync tokens generated by the token generation software 26 are issued to and received by the client software application 37. In some embodiments, the received tokens as linked to a specific client software application. However, in other embodiments, such tokens may be used by different client software applications. For example, in some embodiments, a user device 14 stores a plurality of client software applications, wherein different applications may access different spaces 27, different data sets within the same space 27, or a combination thereof. In such situations, unique tokens can be generated to control the data accessible through each client software application.

As noted above, rather than re-downloading the shared data space 27 (including any public data sets 28) each time a user's permissions change for the space 27, the token generation software 26 may be configured to generate a protected data sync token for new protected data. The user device 14 (the client software application 37) uses the token to download the new protected data without also downloading (or otherwise synchronizing) other portions of the shared data space 27, such as the public data set 28. After completing the download, the client software application 37 performs a synchronization with the shared data space, based on a data space sync token, to synchronize the shared data space 27, including the new protected data.

Figure 4:
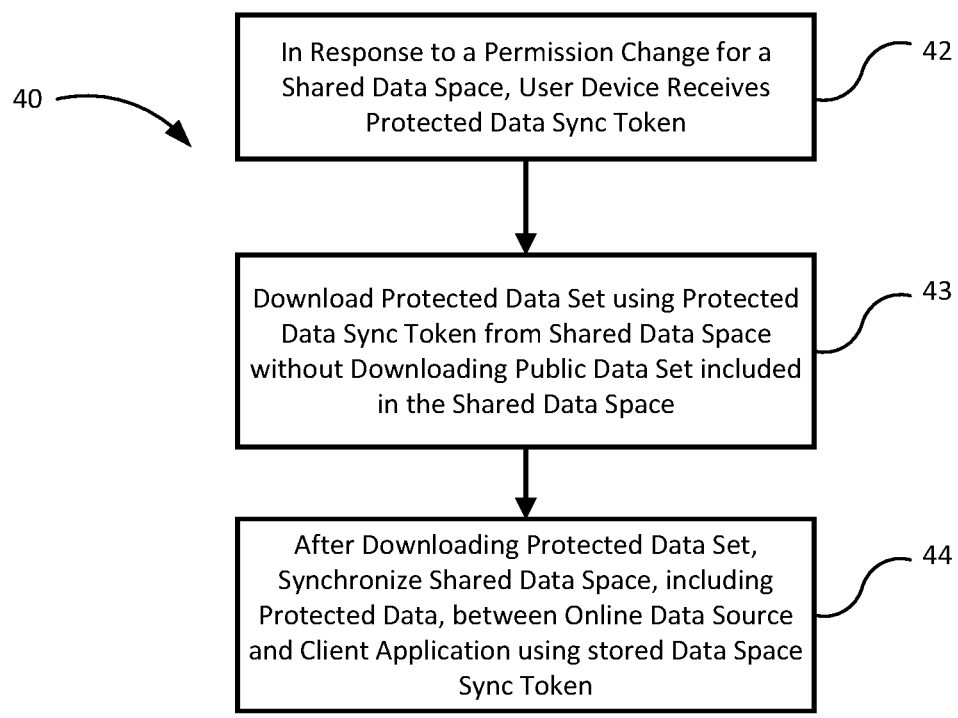
FIG. 4 illustrates a flow chart of a method for synchronizing data performed by the system of FIG. 1 according to one embodiment.

For example, FIG. 4 is a flow chart illustrating a method 40 for synchronizing data between the online data source 12 and the client software application 37 according to one embodiment. The method 40 is described as being performed by the user device 14 (the client software application 37 as executed by the electronic processor 30). However, the method 40 or portions thereof may be performed by other devices or hardware or software components in some embodiments.

As illustrated in FIG. 4, the method 40 includes, in response to a change in a permission for a user of the user device 14 with respect to the shared data space 27, receiving, at the user device 14, a protected data sync token for protected data associated with the changed user permission (at block 42). For example, the user of the user device 14 may join a new team, start a new project, or take on a new role within an existing project and require access to a certain protected data set, such as protected data set 29A. Similarly, as new protected data is added to the shared data space 27, permissions associated with the user may be updated to grant access to the protected data, which represents a change in a permission for the user. In some embodiments, a manager or other administrator controls permissions to protected data. As described above, the received protected data sync token may identify one or more protected data sets the user has been granted permission to access. The protected data sync token may also identify the user, the user device 14, the client software application 37 or a combination thereof.

In some embodiments, the protected data sync token is generated after the user is authenticated. For example, the authentication software 25 may perform multi-factor authentication of the user and successful completion of this authentication process may trigger the generation of the appropriate protected data sync token.

After the user device 14 receives and stores the issued protected data sync token (at block 42), any on-going synchronization actions between the online data source 12 and the client software application 37 ceases (which includes storage of an updated data space sync token), and the new protected data set (for example, protected data set 29A) is downloaded by the client software application 37 using the received protected data sync token without downloading (or otherwise synchronizing) other portions of the shared data space 27, such as the public data set 28 (at block 43).

After the new protected data set 29A is downloaded (at block 43), the shared data space 27, including the protected data 29 downloaded using the protected data sync token, is synchronized (at block 44). Synchronizing the space 27 can include submitting a request to the online data source 12 including the stored data space sync token. As described above, the online data source 12 uses the received data space sync token to identify modifications that need to be applied to the locally-stored copy of the shared data space 27 on the user device 14. As noted above, performing synchronization in this manner provides more efficient use of computing resources (processing cycles, bandwidth, battery life, and the like) as compared to performing a full re-download of the shared data space 27 (including the public data set 28) to the user device 14 for each synchronization as well as each new protected data set made accessible to the user.

In some embodiments, each protected data sync token is stored along with the data space sync token to indicate which protected data sets the user can synchronize. However, in other embodiments, each protected data sync token, after downloading of the associated protected data set and synchronization of the shared data space 27 (including the newly downloaded protected data set), is used to update the data space sync token to indicate that the user may now synchronize the protected data set. For example, the data space sync token may be modified to include a unique identifier of the protected data set(s) the user is allowed to access. After the data space sync token is updated, the protected data sync token may be discarded, which allows for efficient memory usage.

As described above, a change in user permission as described above, may include the granting of access to a new (new to the user or new to the shared data space 27) protected data set in the shared data space 27. Similarly, in some embodiments, a change in a user permission may include the withdrawing of access to an existing protected data set included in the shared data space 27. For example, when a user's permission to a particular protected data set 29 is revoked, previously provided protected data sync tokens may be revoked, which may trigger the deletion of previously-downloaded protected data for the user device 14 (as part of a synchronization as described above) or the data space sync token may be modified to remove an identifier of the protected data set 29. For example, a revocation notice may be provided to the client software application 37 triggering deletion of the previously-provided protected data sync token or removal of the identifier of the protected data set 29 from the data space sync token. Similarly, in some embodiments, the revoking of an authentication token may separately trigger the deletion of any downloaded data associated with the revoked permission to perform this deletion without delay and enforce data integrity before a general synchronization of the space 27 is performed as described above. Accordingly, rather than deleting all previously-downloaded data and subsequently re-downloading the applicable data from the shared data space 27 (which wastes computing resources and introduces delay), just the revoked protected data is deleted without deleting other portions of the shared data space previously downloaded to user device 14, such as public data sets.

Accordingly, as described above, by using a sub-scope synchronization, new protected data is quickly downloaded and available at a client device without re-downloading (or otherwise synchronizing) an entire shared data space, which may include public data in addition to the protected data. Thus, the disclosed synchronization process uses computing resources more efficiently and reduces delays in completing synchronization, especially when new protected data sets are provided.

Various features and advantages of some embodiments are set forth in the following claims.

What is claimed is:

1. A method of synchronizing data between an online data source and a client application, the method comprising:
in response to a change in a permission associated with a user to a protected data set included in a shared data space of the online data source,
receiving, with the client application associated with the user, a protected data synchronization token issued by the online data source associated with the protected data set;
downloading, with the client application, the protected data set included in the shared data space from the online data source to the client application using the protected data synchronization token without re-downloading a public data set included in the shared data space; and
after downloading the protected data set, synchronizing the shared data space, including the protected data set and the public data set, between the online data source and the client application using a stored data space synchronization token.

2. The method of claim 1, further comprising, providing authenticating information, from the client application to the online data source, prior to receiving the protected data synchronization token.

3. The method of claim 2, wherein providing authenticating information includes completing multi-factor authentication.

4. The method of claim 1, wherein downloading the protected data set includes downloading a new protected data set included in the shared data space, wherein the change in permission includes the user being granted permission to access the new protected data set and wherein the protected data synchronization token includes an identifier of the new protected data set.

5. The method of claim 1, wherein synchronizing the shared data space includes synchronizing the shared data space using the stored data space synchronization token and the protected data synchronization token.

6. The method of claim 1, wherein synchronizing the shared data space includes identifying changes made to the shared data space since a previous synchronization and applying the changes to a locally-stored copy of the shared data space.

7. The method of claim 6, wherein applying the changes includes applying changes made to the protected data set while the protected data set was being downloaded.

8. The method of claim 1, further comprising storing the data space synchronization token before downloading the protected data set.

9. A system for synchronizing data between an online data source and a client application, the system comprising:

a user device including a memory storing the client application and an electronic processor configured to execute the client application to
in response to a change in a permission associated with a user to a first data set included in a shared data space of the online data source,
receive a data synchronization token from the online data source associated with the first data set,
download the first data set included in the shared data space from the online data source to the client application using the data synchronization token without re-downloading a second data set included in the shared data space, and
after downloading the first data set, synchronize the shared data space, including the first data set and the second data set, between the online data source and the client application using a stored data space synchronization token and the data synchronization token associated with the first data set.

10. The system of claim 9, wherein the electronic processor is further configured to provide authenticating information to the online data source prior to receiving the data synchronization token.

11. The system of claim 10, wherein the authenticating information includes multi-factor authentication.

12. The system of claim 9, wherein the electronic processor is configured to download the first data set by downloading a new data set included in the shared data space, wherein the change in permission includes the user being granted permission to access the new data set and wherein the data synchronization token includes an identifier of the new data set.

13. The system of claim 9, wherein the electronic processor is configured to synchronize the shared data space by identifying changes made to the shared data space since a previous synchronization and applying the changes to a locally-stored copy of the shared data space.

14. The system of claim 13, wherein the electronic processor is configured to apply the changes by applying changes made to the first data set while the first data set was being downloaded.

15. The system of claim 14, wherein the electronic processor is further configured to store the data space synchronization token before downloading the first data set.

16. The system of claim 9, wherein the first data set is a protected data set and the second data set is a public data set.

17. The system of claim 9, wherein at least a portion of at least one of the first data set and the second data set is encrypted.

18. The system of claim 9, wherein at least one of the first data set and the second data set includes a plurality of layers of data requiring different levels of authentication.

19. The system of claim 9, wherein at least one of the first data set and the second data set includes a layer of data including a plurality of scopes, wherein each of the plurality of scopes requires a different level of authentication.

20. A non-transitory computer-readable medium storing instructions that, when executed by an electronic processor, perform a set of functions, the set of functions including:
in response to a change in a permission associated with a user to data included in a shared data space of an online data source, the change in the permission including the withdrawal of a permission to a protected data set included in the stored data space
receiving, at a client application, a revocation notice from the online data source for a previously received protected data synchronization token associated with the protected data set; and
in response to the revocation notice,
deleting the protected data synchronization token,
deleting the protected data set from a locally-stored copy of the shared data space without deleting a public data set from the locally-stored copy of the shared data space, and
after deleting the protected data set, synchronizing the shared data space, including the public data set and excluding the protected data set, between the online source and the client application using a stored data space synchronization token.

* * * * *